(12) United States Patent
Kosugi et al.

(10) Patent No.: US 9,019,652 B1
(45) Date of Patent: Apr. 28, 2015

(54) HEAD POSITION DEMODULATING METHOD AND MAGNETIC DISK DEVICE

(71) Applicant: Kabushiki Kaisha Toshiba, Minato-ku, Tokyo (JP)

(72) Inventors: Tatsuhiko Kosugi, Yokohama (JP); Kazunori Mori, Machida (JP); Hiroshi Ooyabu, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/177,826

(22) Filed: Feb. 11, 2014

Related U.S. Application Data

(60) Provisional application No. 61/891,121, filed on Oct. 15, 2013.

(51) Int. Cl.
*G11B 5/596* (2006.01)

(52) U.S. Cl.
CPC .................................. *G11B 5/59688* (2013.01)

(58) Field of Classification Search
CPC ...................... G11B 20/10222; G11B 5/59644; G11B 2020/1281; G11B 20/10268; G11B 2220/2516; G11B 5/59655; G11B 11/00; G11B 21/02; G11B 5/5526
USPC .............. 360/75, 76, 77.04, 29, 77.07, 78.14, 360/78.06, 78.04, 77.08
See application file for complete search history.

(56) References Cited

U.S. PATENT DOCUMENTS

| 5,694,265 | A | 12/1997 | Kosugi et al. | |
|---|---|---|---|---|
| 5,757,576 | A | 5/1998 | Kosugi | |
| 6,078,460 | A * | 6/2000 | Moriya | 360/77.04 |
| 6,262,861 | B1 | 7/2001 | Kosugi | |
| 8,520,334 | B2 * | 8/2013 | Takaishi | 360/78.14 |
| 8,553,345 | B2 * | 10/2013 | Oyabu et al. | 360/29 |
| 8,625,230 | B2 * | 1/2014 | Kosugi et al. | 360/76 |
| 2012/0162805 | A1 | 6/2012 | Takaishi | |
| 2012/0293885 | A1 | 11/2012 | Kosugi et al. | |
| 2012/0314321 | A1 | 12/2012 | Oyabu et al. | |
| 2014/0078614 | A1 * | 3/2014 | Sudo | 360/75 |

FOREIGN PATENT DOCUMENTS

| JP | 2012-138142 | 7/2012 |
|---|---|---|
| JP | 2012-243367 | 12/2012 |
| JP | 2013-004109 | 1/2013 |

* cited by examiner

*Primary Examiner* — Ali Neyzari
(74) *Attorney, Agent, or Firm* — Knobbe, Martens, Olson & Bear LLP

(57) ABSTRACT

According to one embodiment, a head position demodulating method and a magnetic disk device switch a demodulation window such that an amplitude of a fundamental wave component of a null-type burst pattern transitions from a decreasing direction to an increasing direction along with an increase in seek speed during demodulation of the null-type burst pattern recorded on a magnetic disk.

20 Claims, 8 Drawing Sheets

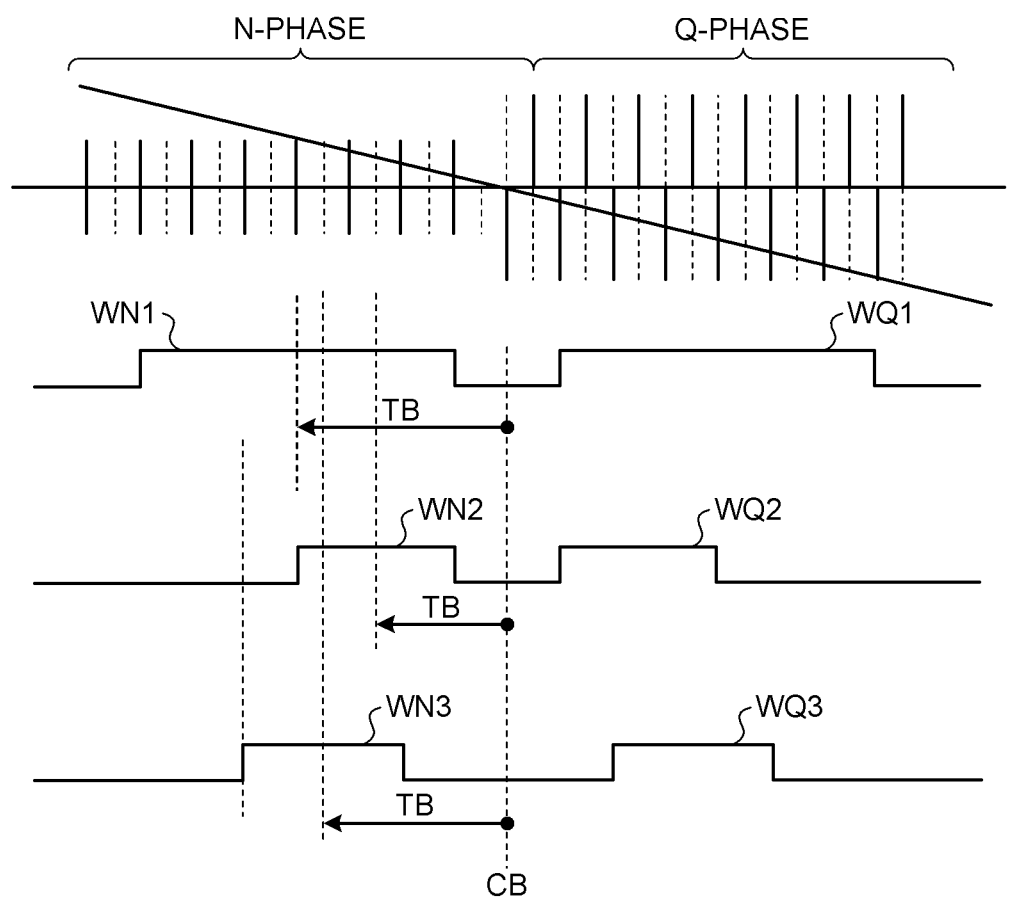

HEAD POSITION DEMODULATING METHOD AND MAGNETIC DISK DEVICE

CROSS-REFERENCE TO RELATED APPLICATIONS

This application is based upon and claims the benefit of priority from Provisional Patent Application No. 61/891,121, filed on Oct. 15, 2013; the entire contents of which are incorporated herein by reference.

FIELD

Embodiments described herein relate generally to a head position demodulating method and a magnetic disk device.

BACKGROUND

The magnetic disk device retrieves the sector-cylinder number in servo data and burst data indicative of location information on a track, and performs positioning of a magnetic head based on these information.

BRIEF DESCRIPTION OF THE DRAWINGS

FIG. 6 is a diagram illustrating a relationship between time from the burst center and a demodulation window in the magnetic disk device according to one embodiment;

DETAILED DESCRIPTION

According to one embodiment, during demodulation of a null-type burst pattern recorded on a magnetic disk, a demodulation window is switched such that the amplitude of the fundamental wave component of the null-type burst pattern transitions from a decreasing direction to an increasing direction along with an increase in seek speed.

Exemplary embodiments of a head position demodulating method and a magnetic disk device will be explained below in detail with reference to the accompanying drawings. The present invention is not limited to the following embodiments.

First Embodiment

Figure 1:
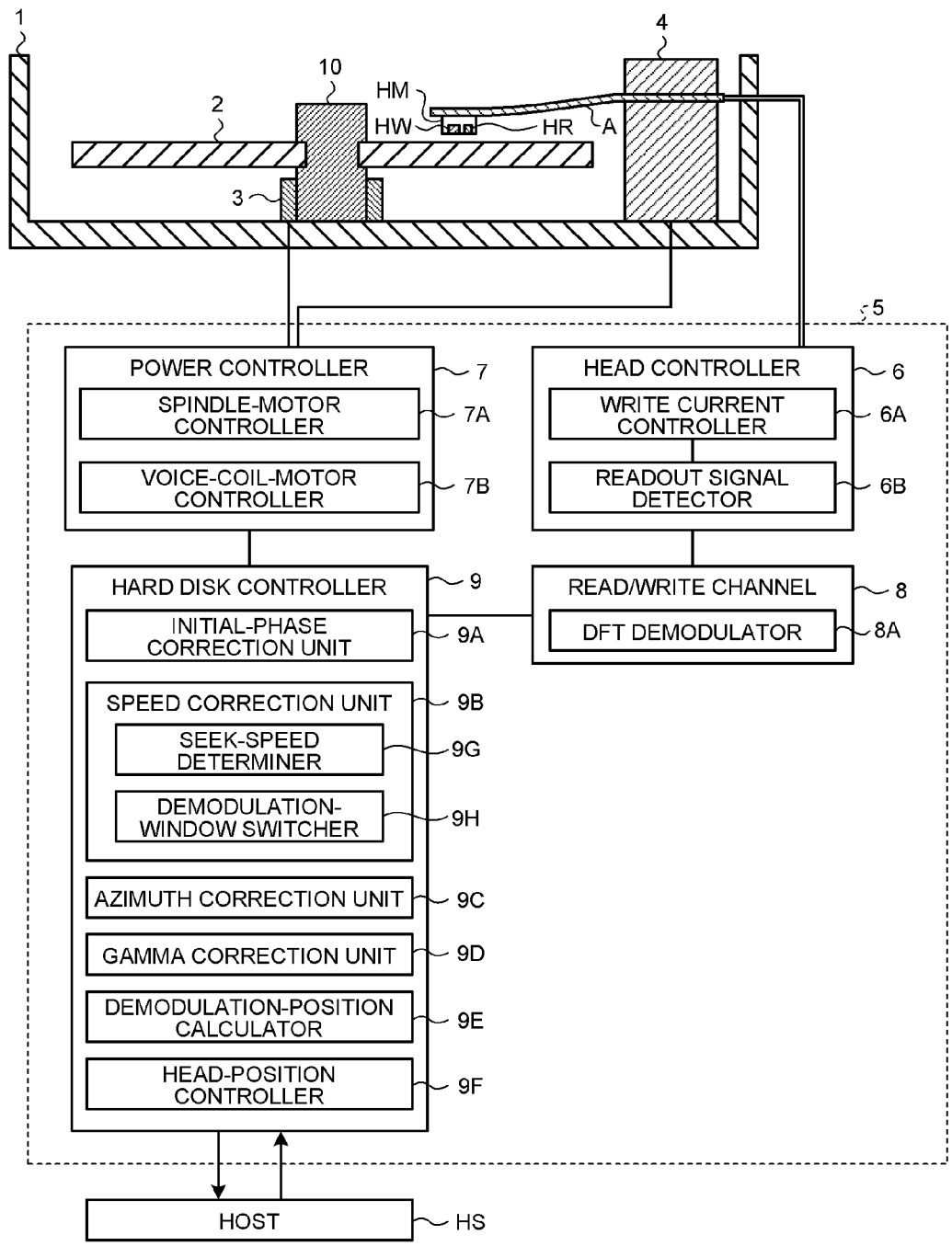
FIG. 1 is a block diagram illustrating a schematic configuration of a magnetic disk device according to one embodiment.
Figure 2A:
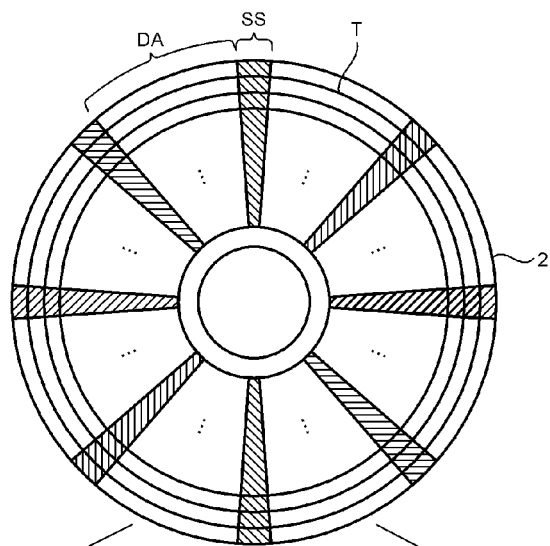
FIG. 2A is a plan view illustrating a track arrangement in the magnetic disk of FIG. 1.
Figure 2B:
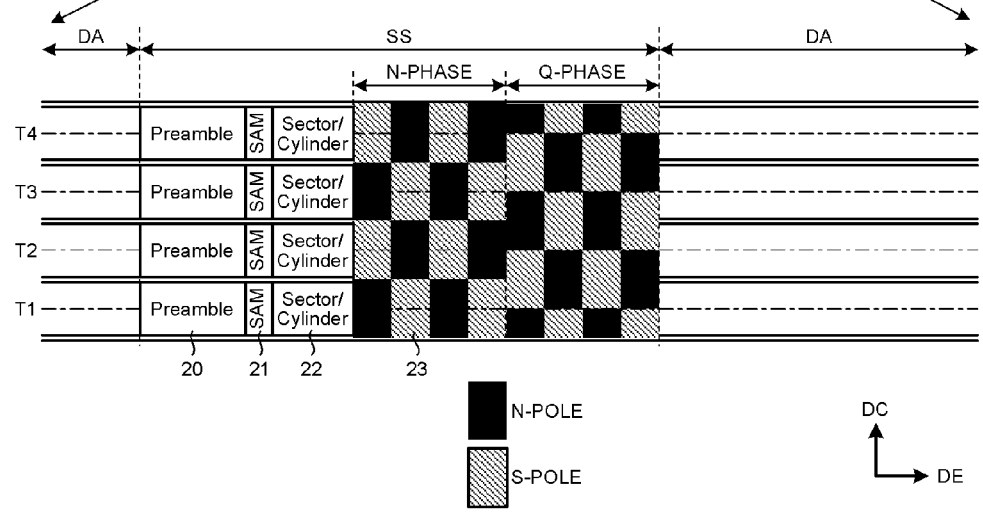
FIG. 2B is a diagram illustrating an exemplary configuration of a servo area of FIG. 2A.

FIG. 1 is a block diagram illustrating a schematic configuration of a magnetic disk device according to a first embodiment. FIG. 2A is a plan view illustrating track arrangement in the magnetic disk of FIG. 1. FIG. 2B is a diagram illustrating an exemplary configuration of a servo area of FIG. 2A.

In FIG. 1, the magnetic disk device includes a magnetic disk 2. The magnetic disk 2 is supported via a spindle 10. The magnetic disk device also includes a magnetic head HM. The magnetic head HM includes a write head HW and a read head HR. The write head HW and the read head HR are arranged facing the magnetic disk 2. Here, the magnetic head HM is held on the magnetic disk 2 via an arm A. The arm A can slide the magnetic head HM within the horizontal surface, for example, during a seek.

Here, as illustrated in FIG. 2A and FIG. 2B, the magnetic disk 2 includes tracks T along a down-track direction DE. On each track T, a data area DA to which user data is written and a servo area SS to which servo data is written are disposed. Here, the servo areas SS are radially arranged. The data area DA is arranged between the servo areas SS along the down-track direction DE. To the servo area SS, as illustrated in FIG. 2B, a preamble 20, a servo-area mark 21, sector/cylinder information 22, and a burst pattern 23 are written. The sector/cylinder information 22 can provide a servo address in a circumferential direction and a radial direction of the magnetic disk 2, and can be used for seek control that moves the magnetic head HM to a target track. The burst pattern 23 can be used for tracking control that positions the magnetic head HM within a target range of the target track. These portions of servo data may be recorded on the magnetic disk 2 by self-servo write or may be recorded on the magnetic disk 2 by a dedicated servo writer.

Here, the burst pattern 23 can employ a null-type burst pattern formed of an N-phase and a Q-phase. For the N-phase and the Q-phase, magnetized patterns can be disposed such that the polarities (the N-pole and the S-pole) are alternately inverted at intervals of 180 degrees (=1 cyl) along a cross-track direction DC. Furthermore, the N-phase and the Q-phase are arranged to each have phases mutually shifted by 90 degrees (=0.5 cyl) along the cross-track direction DC at their boundaries. For example, the N-phase is arranged to have polarities inverted at the boundaries between mutually adjacent tracks T1 to T4. The Q-phase is arranged to have polarities inverted in each center of the tracks T1 to T4.

Referring again to FIG. 1, the magnetic disk device includes a voice coil motor 4 that drives the arm A and a spindle motor 3 that rotates the magnetic disk 2 via the spindle 10. The magnetic disk 2, the magnetic head HM, the arm A, the voice coil motor 4, the spindle motor 3, and the spindle 10 are housed in a case 1.

The magnetic disk device includes a magnetic recording controller 5. The magnetic recording controller 5 includes a head controller 6, a power controller 7, a read/write channel 8, and a hard disk controller 9. Here, the magnetic recording controller 5 can calculate a demodulation position of the magnetic head HM based on the burst pattern 23 read by the read head HR. At this time, the magnetic recording controller 5 can switch the demodulation window such that the amplitude of the fundamental wave component of the burst pattern 23 transitions from a decreasing direction to an increasing direction along with an increase in seek speed, during demodulation of the burst pattern 23 read by the read head HR. Here, this seek speed is a speed of the magnetic head HM along the cross-track direction DC when the magnetic disk 2 rotates at a constant speed.

The head controller 6 includes a write current controller 6A and a readout signal detector 6B. The power controller 7 includes a spindle-motor controller 7A and a voice-coil-motor controller 7B. The read/write channel 8 includes a discrete Fourier transform (DFT) demodulator 8A. The hard disk controller 9 includes an initial-phase correction unit 9A, a speed correction unit 9B, an azimuth correction unit 9C, a gamma correction unit 9D, a demodulation-position calculator 9E, and a head-position controller 9F.

The head controller 6 can amplify and detect a signal during recording/reading. The write current controller 6A can control a write current flowing to the write head HW. The readout signal detector 6B can detect a signal read by the read head HR.

The power controller 7 can drive the voice coil motor 4 and the spindle motor 3. The spindle-motor controller 7A can control rotation of the spindle motor 3. The voice-coil-motor controller 7B can control driving of the voice coil motor 4.

The read/write channel 8 exchanges data between the head controller 6 and the hard disk controller 9. The data includes read data, write data, and servo data. For example, the read/write channel 8 can convert a signal read out by the read head HR into a data format handled by the host HS and can convert data output from the host HS into a signal format recorded by the write head HW. These format conversions include DA conversion and encoding. The read/write channel 8 can perform decode processing on a signal read out by the read head HR and can perform code modulation on data output from the host HS. The DFT demodulator 8A can extract the fundamental wave component when a DFT operation is performed on the burst pattern 23 with respect to a signal read out by the read head HR. This fundamental wave component can be the sine component or the cosine component in the N-phase and the Q-phase of the burst pattern 23. In the following description, a curved line by expressing on the phase plane, a relationship between the sine component of the N-phase and the sine component of the Q-phase in the burst pattern 23 or a relationship between the cosine component of the N-phase and the cosine component of the Q-phase in the burst pattern 23 is referred to as a position Lissajous figure. A curved line by expressing, on the phase plane, a relationship between the sine component and the cosine component of the N-phase in the burst pattern 23 or a relationship between the sine component and the cosine component of the Q-phase in the burst pattern 23 is referred to as a complex Lissajous figure. This complex Lissajous figure draws a real part and an imaginary part of the fundamental wave component in the burst pattern 23 read out by the read head HR.

The hard disk controller 9 can perform recording/reading control based on a command from outside and can exchange data between the outside and the read/write channel 8. The initial-phase correction unit 9A rotates the complex Lissajous figure in the N-phase and the Q-phase of the burst pattern 23, which is read by the read head HR, by a predetermined angle so as to perform initial phase correction.

The speed correction unit 9B performs speed compensation so as to reduce the ellipticity of the position Lissajous figure of the fundamental wave component in the burst pattern 23 read by the read head HR. That is, the phase of the fundamental wave component in the burst pattern 23 is corrected such that the position Lissajous figure deformed into an elliptical shape by seeking has a shape close to a circular shape. The speed correction unit 9B can switch the demodulation window such that the amplitude of the fundamental wave component of the burst pattern 23 transitions from the decreasing direction to the increasing direction along with an increase in seek speed, during demodulation of the burst pattern 23. Here, the speed correction unit 9B includes a seek-speed determiner 9G and a demodulation-window switcher 9H. The seek-speed determiner 9G can determine the seek speed of the magnetic head HM. The demodulation-window switcher 9H can switch the demodulation window with respect to the burst pattern 23. At this time, the demodulation-window switcher 9H can switch the demodulation window such that the amplitude of the fundamental wave component of the burst pattern 23 does not become indefinite.

The azimuth correction unit 9C rotates the position Lissajous figure of the fundamental wave component of the burst pattern 23 by a predetermined angle so as to reduce the gradient of the position Lissajous figure deformed into a rectangular shape due to the read position of the burst pattern 23 on the magnetic disk 2. The gamma correction unit 9D corrects the arithmetic expression for obtaining the position of the magnetic head HM from the fundamental wave component of the burst pattern 23 so as to improve the linearity of a change in position of the magnetic head HM with respect to a change in fundamental wave component of the burst pattern 23. The demodulation-position calculator 9E calculates the demodulation position of the magnetic head HM based on the fundamental wave component of the burst pattern 23. The head-position controller 9F controls the position of the magnetic head HM based on the calculation result of the demodulation position of the magnetic head HM.

The magnetic recording controller 5 is coupled to the host HS. The host HS may be a personal computer that issues a write command, a read command, and similar command to the magnetic disk device, or may be an external interface.

The following describes operation of the magnetic disk device in FIG. 1.

While the spindle motor 3 rotates the magnetic disk 2, a signal is read out from the magnetic disk 2 via the read head HR and is detected by the readout signal detector 6B. The signal detected by the readout signal detector 6B undergoes data conversion by the read/write channel 8 and then is transmitted to the hard disk controller 9. In this data convert, the DFT demodulator 8A performs a DFT operation on the burst pattern 23 with respect to a signal read out by the read head HR so as to extract the sine components and the cosine components of the N-phase and the Q-phase in the burst pattern 23. Subsequently, the hard disk controller 9 calculates the demodulation position of the magnetic head HM based on the sine components or the cosine components of the N-phase and the Q-phase in the burst pattern 23 detected by the readout signal detector 6B. In the following description, a description will be given of an example where the demodulation position of the magnetic head HM is calculated based on the sine components of the N-phase and the Q-phase in the burst pattern 23.

At this time, the initial-phase correction unit 9A rotates the complex Lissajous figure by a predetermined angle so as to reduce the gradient of the long axis of the complex Lissajous figure in the N-phase and the Q-phase of the burst pattern 23. The speed correction unit 9B switches the demodulation window such that the amplitude of the fundamental wave component of the burst pattern 23 does not become indefinite corresponding to the seek speed. Subsequently, the speed compensation is performed so as to reduce the ellipticity of the position Lissajous figure of the sine components of the N-phase and the Q-phase of the burst pattern 23. This speed compensation can correct the phase relationship between the sine components of the N-phase and the Q-phase of the burst pattern 23. In case of correcting this phase relationship, the gain due to the seek speed can be ignored. Furthermore, the azimuth correction unit 9C rotates the position Lissajous figure of the sine components of the N-phase and the Q-phase of the burst pattern 23 by a predetermined angle so as to reduce the gradient of the position Lissajous figure deformed into a rectangular shape. Furthermore, the gamma correction unit 9D corrects the arithmetic expression for obtaining the position of the magnetic head HM from the fundamental wave component of the burst pattern 23 so as to improve the linearity of the change in position of the magnetic head HM with respect to the change in fundamental wave component of the burst pattern 23. Subsequently, the demodulation-position calculator 9E applies the arithmetic expression corrected by the gamma correction unit 9D to calculate the demodulation position of the magnetic head HM. Subsequently, the head-position controller 9F controls the position of the magnetic head HM during a seek based on the calculation result of the demodulation position of the magnetic head HM.

Here, by the switching of the demodulation window such that the amplitude of the fundamental wave component of the burst pattern 23 transitions from the decreasing direction to the increasing direction along with the increase in seek speed, the amplitude of the fundamental wave component of the burst pattern 23 can be set not to be indefinite even in the case where the seek speed has increased. This allows improving the linearity during demodulation of the head position even in the case where the seek speed increases, thus improving stability at the time of the termination of seeking. For example, in the case where the demodulation window is fixed, the limit of the seek speed that ensures the linearity during demodulation of the head position has been about 0.3 m/sec. Even in the case where the demodulation window is narrowed, the limit of the seek speed that ensures the linearity during demodulation of the head position has been around 0.5 m/sec. In contrast, by switching the demodulation window such that the amplitude of the fundamental wave component of the burst pattern 23 transitions from the decreasing direction to the increasing direction along with the increase in seek speed, the seek speed that ensures the linearity during demodulation of the head position can be improved up to around 3 m/sec.

Figure 3:
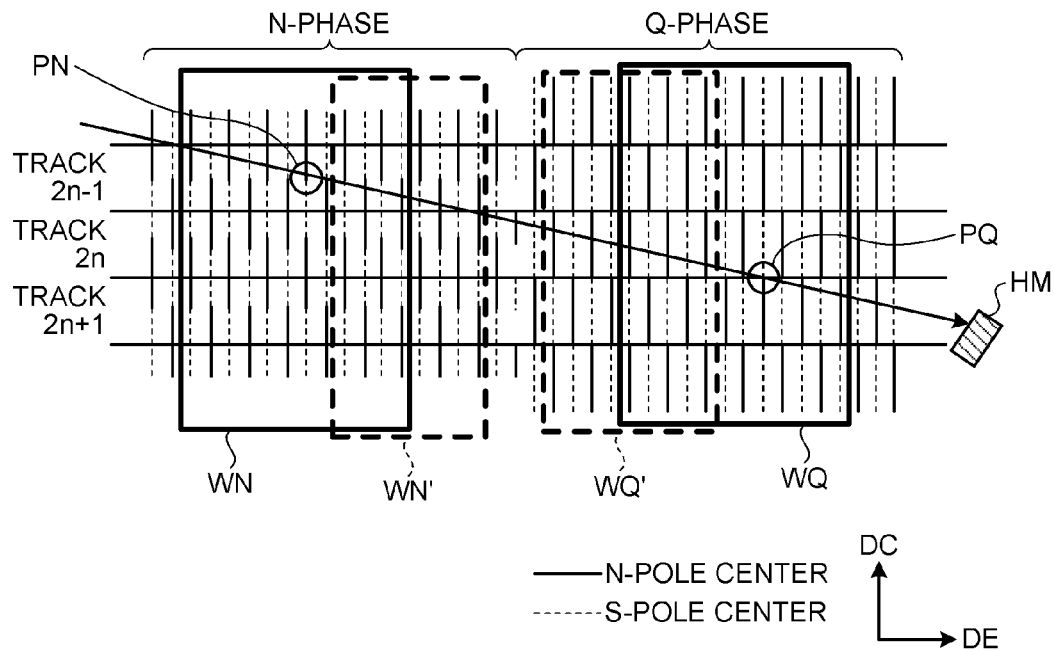
FIG. 3 is a diagram illustrating a setting method of a demodulation window during a seek in the magnetic disk device according to one embodiment.

FIG. 3 is a diagram illustrating a setting method of the demodulation window during a seek in the magnetic disk device according to one embodiment.

In FIG. 3, the magnetic head HM diagonally crosses tracks 2n−1 to 2n+1 (where "n" is a positive integer) during a seek. Accordingly, at trace points PN and PQ, the magnetic head HM is located on the boundary between the N-pole and the S-pole. Therefore, the amplitude of the fundamental wave component of the burst pattern 23 becomes zero. Here, assuming that the demodulation windows are denoted by WN and WQ, the trace points PN and PQ are included. This reduces the amplitude of the fundamental wave component of the burst pattern 23, thus reducing the linearity during demodulation of the head position. In contrast, when the demodulation windows are switched from WN and WQ to WN' and WQ', the trace points PN and PQ are not included. This increases the amplitude of the fundamental wave component of the burst pattern 23, thus improving the linearity during demodulation of the head position compared with the case where the demodulation windows are WN and WQ.

Figure 4:
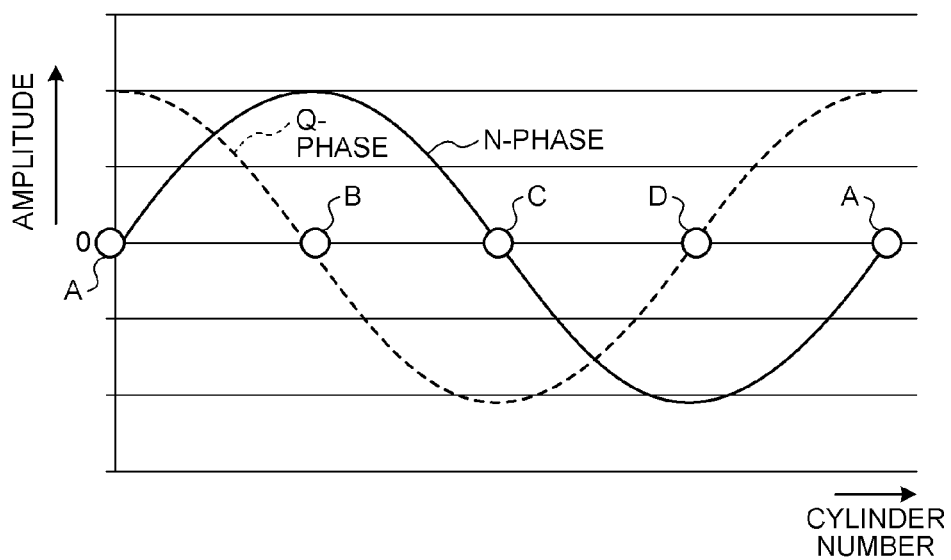
FIG. 4 is a diagram illustrating a waveform of a fundamental wave component when a null-type burst pattern is scanned in a track direction in the magnetic disk device according to one embodiment.

FIG. 4 is a diagram illustrating a waveform of the fundamental wave component when a null-type burst pattern is scanned along the down-track direction DE in the magnetic disk device according to one embodiment.

In FIG. 4, in the case where the magnetic head HM scans the track T along the down-track direction DE, the sine components of the N-phase and the Q-phase are shifted by 90° in a phase relationship.

Figure 5A:
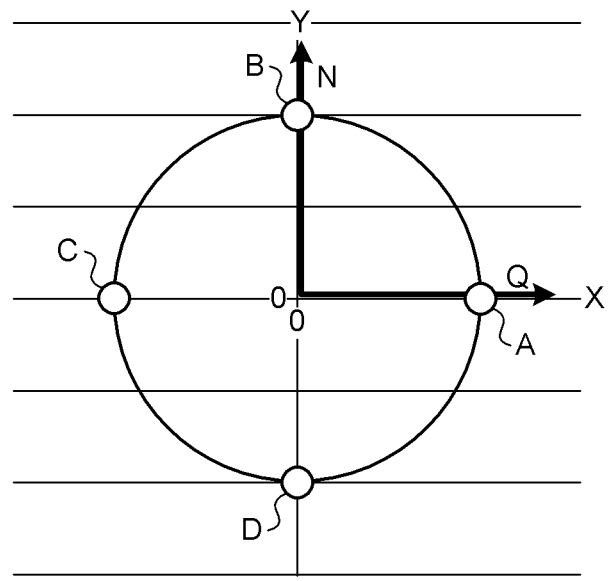
FIG. 5A is a diagram illustrating a position Lissajous figure of the fundamental wave component in FIG. 4.
Figure 5B:
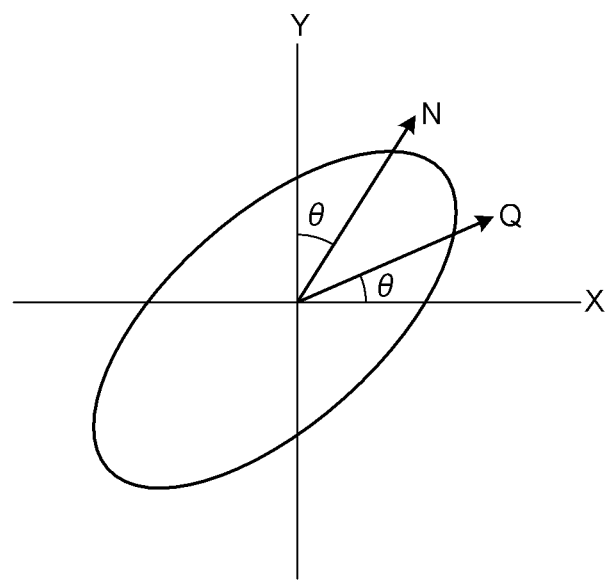
FIG. 5B is a diagram illustrating a position Lissajous figure of the fundamental wave component during a seek.

FIG. 5A is a diagram illustrating the position Lissajous figure of the fundamental wave component in FIG. 4. FIG. 5B is a diagram illustrating the position Lissajous figure of the fundamental wave component during a seek.

As illustrated in FIG. 5A, the position Lissajous figure becomes a circle when the Q-phase is plotted on the X-axis of the phase plane while the N-phase is plotted on the Y-axis of the phase plane in the waveform of FIG. 4. Points A to D in FIG. 5A correspond to respective points A to D in FIG. 4. On the other hand, during a seek, as illustrated in FIG. 5B, the phase of the Q-phase and the phase of the N-phase rotate in mutually opposite directions. Thus, the position Lissajous figure is flattened. At this time, a rotation angle θ is proportional to the seek speed. Flattening the position Lissajous figure reduces the linearity of the phase relationship between the sine components of the N-phase and the Q-phase, thus reducing the demodulation accuracy of the head position. Accordingly, speed compensation is performed so as to reduce the ellipticity of the position Lissajous figure in the speed correction unit 9B.

Here, assuming that the vector of the sine components of the N-phase and the Q-phase before the correction is (X, Y) and the vector of the sine components of the N-phase and the Q-phase after the correction is (Ux, Uy), the relationship between (X, Y) and (Ux, Uy) can be given by the following formula.

$$\begin{pmatrix} X \\ Y \end{pmatrix} = \begin{pmatrix} \cos\theta & -\sin\theta \\ \sin\theta & \cos\theta \end{pmatrix} \begin{pmatrix} Ux \\ 0 \end{pmatrix} + \begin{pmatrix} \cos\theta & \sin\theta \\ -\sin\theta & \cos\theta \end{pmatrix} \begin{pmatrix} 0 \\ Uy \end{pmatrix}$$

$$= \begin{pmatrix} \cos\theta & \sin\theta \\ \sin\theta & \cos\theta \end{pmatrix} \begin{pmatrix} Ux \\ Uy \end{pmatrix}$$

As illustrated below, inverse conversion on the above formula allows obtaining (Ux, Uy).

$$\begin{pmatrix} Ux \\ Uy \end{pmatrix} = \frac{1}{\cos^2\theta - \sin^2\theta} \begin{pmatrix} \cos\theta & -\sin\theta \\ -\sin\theta & \cos\theta \end{pmatrix} \begin{pmatrix} X \\ Y \end{pmatrix}$$

With this formula, when θ=45+90m ("m" is a positive integer), (Ux, Uy) becomes indefinite and the head position cannot be demodulated. Here, the rotation angle θ (rad) can be given by the following formula.

$$\theta = Vel/TW \times \pi \times TB$$

Here, Vel (m/sec) indicates a seek speed, TW (m) indicates a track width, TB (sec) indicates time from the burst center (the boundary between the N-phase and the Q-phase) to the center of the demodulation window.

Here, switching the demodulation window allows changing the time TB from the burst center. Accordingly, also in the case where the seek speed increases, switching the demodulation window allows avoiding the state where θ=45+90m, thus preventing (Ux, Uy) from being indefinite.

FIG. 6 is a diagram illustrating a relationship between the time from the burst center and the demodulation window in the magnetic disk device according to one embodiment.

In FIG. 6, setting respective demodulation windows WN1 and WQ1 with respect to the N-phase and the Q-phase allows setting the time TB from the burst center CB to be 40 nsec. Additionally, setting respective demodulation windows WN2 and WQ2 with respect to the N-phase and the Q-phase allows setting the time TB from the burst center CB to be 25 nsec. Additionally, setting respective demodulation windows WN3 and WQ3 with respect to the N-phase and the Q-phase allows setting the time TB from the burst center CB to be 35 nsec. These values of the time TB are examples and the time TB is not limited to these values.

Accordingly, switching the demodulation window allows changing the time TB from the burst center CB so as to prevent (Ux, Uy) from being indefinite also in the case where the seek speed increases.

In order to reduce level difference along with switching of the demodulation window, the respective demodulation windows WN1, WQ1, WN2, WQ2, WN3, and WQ3 are preferred to be set with respect to the N-phase and the Q-phase so as to be mutually symmetrical with respect to the burst center CB.

Figure 7A:
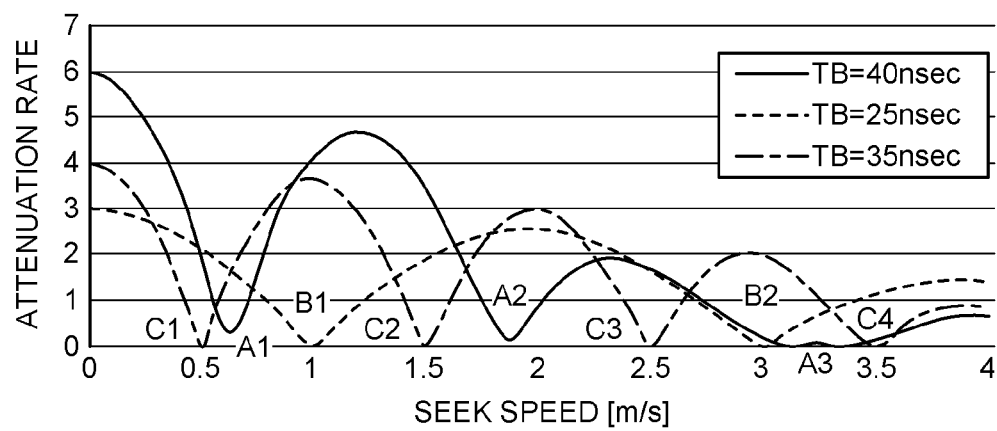
FIG. 7A is a diagram illustrating a relationship between a seek speed and an attenuation rate of a DFT integration value when the time from the burst center is changed.
Figure 7B:
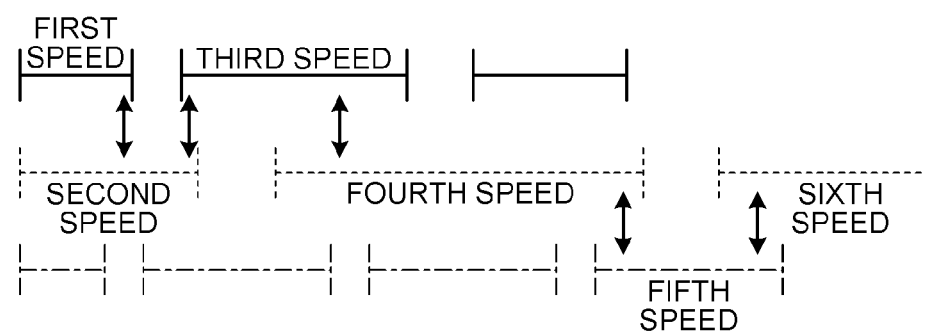
FIG. 7B is a diagram illustrating a switching method of the demodulation window corresponding to the seek speed.

FIG. 7A is a diagram illustrating a relationship between the seek speed and the attenuation rate of a DFT integration value when the time from the burst center is changed. FIG. 7B is a diagram illustrating a switching method of the demodulation window corresponding to the seek speed. FIG. 7A illustrates respective attenuation rates of the demodulation windows WN1, WQ1, WN2, WQ2, WN3, and WQ3 in FIG. 6. This attenuation rate corresponds to the amplitude of the fundamental wave component of the burst pattern 23. The increase and the decrease in attenuation rate here can correspond to the increase and the decrease in amplitude of the fundamental wave component of the burst pattern 23.

In FIG. 7A, in case of the demodulation windows WN1 and WQ1 (TB=40 nsec), turning points A1 to A3 occur. At the turning points A1 to A3, the attenuation rate turns from the decreasing direction to the increasing direction along with the increase in seek speed. In case of the demodulation windows WN2 and WQ2 (TB=25 nsec), turning points B1 and B2 occur. At the turning points B1 and B2, the attenuation rate turns from the decreasing direction to the increasing direction along with the increase in seek speed. In case of the demodulation windows WN3 and WQ3 (TB=35 nsec), turning points C1 to C4 occur. At the turning points C1 to C4, the attenuation rate turns from the decreasing direction to the increasing direction along with the increase in seek speed.

Here, for example, in the case where the demodulation windows WN1 and WQ1 are fixed, the attenuation rate becomes close to zero at the turning points A1 to A3. Thus, a seek speed where (Ux, Uy) becomes indefinite exists. Accordingly, in the case where the seek speed becomes close to the turning points A1 to A3 when the demodulation windows WN1 and WQ1 are set, the demodulation windows are switched to the demodulation windows WN3 and WQ3 or the demodulation windows WN2 and WQ2 so as to prevent (Ux, Uy) from being indefinite.

Accordingly, as illustrated in FIG. 7B, the seek speed is divided such that a seek speed in the vicinity of the turning point per each time TB from the burst center CB (hereinafter referred to as a blank speed) is not included. The vicinity of the turning point can be set in a range where the attenuation rate is equal to or less than a predetermined value. For example, in case of the demodulation windows WN1 and WQ1 (TB=40 nsec), the seek speed is divided such that a seek speed in the vicinity of the turning points A1 to A3 is not included. In case of the demodulation windows WN2 and WQ2 (TB=25 nsec), the seek speed is divided such that a seek speed in the vicinity of the turning points B1 and B2 is not included. In case of demodulation windows WN3 and WQ3 (TB=35 nsec), the seek speed is divided such that a seek speed in the vicinity of the turning points C1 to C4 is not included. At the blank speed of each demodulation window, switching to other demodulation windows can prevent the attenuation rate from being equal to or less than a predetermined value.

For example, a first speed to a sixth speed can be set to a divided section of the seek speed. The first speed and the third speed can be assigned to the demodulation windows WN1 and WQ1 (TB=40 nsec). The second speed, the fourth speed, and the sixth speed can be assigned to the demodulation windows WN2 and WQ2 (TB=25 nsec). The fifth speed can be assigned to the demodulation windows WN3 and WQ3 (TB=35 nsec). When the seek speed is the first speed or the third speed, the demodulation windows WN1 and WQ1 can be selected. When the seek speed is the second speed, the fourth speed, or the sixth speed, the demodulation windows WN2 and WQ2 can be selected. When the seek speed is the fifth speed, the demodulation windows WN3 and WQ3 can be selected.

Here, in the adjacent speed sections from the first speed to the sixth speed, overlap portions can be disposed. This allows switching the demodulation window before the respective amplitudes of the fundamental wave component of the burst pattern 23 with respect to the seek speed coincides with each other between the demodulation windows. For example, in the case where the seek speed increases when the seek speed is the first speed, the demodulation windows WN1 and WQ1 can be switched to the demodulation windows WN2 and WQ2 so as to shift the seek speed to the second speed before the seek speed reaches the upper limit of the first speed. On the other hand, in the case where the seek speed decreases when the second speed is the seek speed, the demodulation windows WN2 and WQ2 can be switched to the demodulation windows WN1 and WQ1 so as to shift the seek speed to the first speed before the seek speed reaches the lower limit of the second speed.

Figure 8:
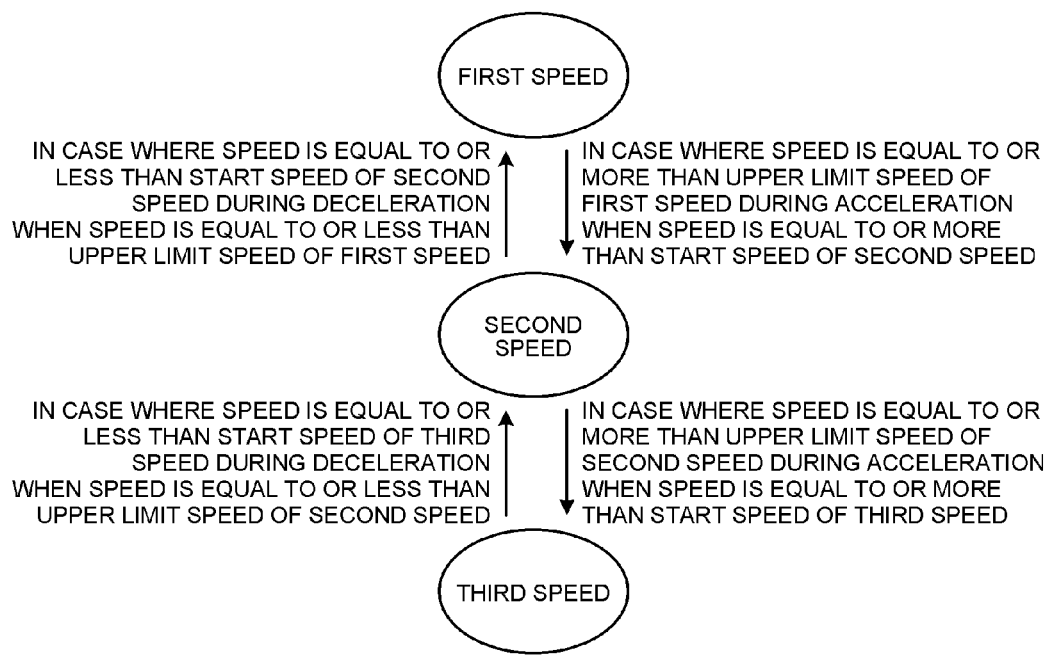
FIG. 8 is a diagram illustrating a switching method of demodulation window corresponding to acceleration or deceleration.

FIG. 8 is a diagram illustrating a switching method of the demodulation window corresponding to acceleration or deceleration.

In FIG. 8, in the case where the seek speed is equal to or less than the start speed of the second speed during deceleration, the seek speed transitions from the second speed to the first speed when the seek speed is equal to or less than the upper limit speed of the first speed. In the case where the seek speed is equal to or more than the upper limit speed of the first speed during acceleration, the seek speed transitions from the first speed to the second speed when the seek speed is equal to or more than the start speed of the second speed. In the case where the seek speed is equal to or less than the start speed of the third speed during deceleration, the seek speed transitions from the third speed to the second speed when the seek speed is equal to or less than the upper limit speed of the second speed. In the case where the seek speed is equal to or more than the upper limit speed of the second speed during acceleration, the seek speed transitions from the second speed to the third speed when the seek speed is equal to or more than the start speed of the third speed. In the example of FIG. 8, the first speed to the third speed in FIG. 7B are described. The same applies to the speed after the third speed.

Figure 9A:
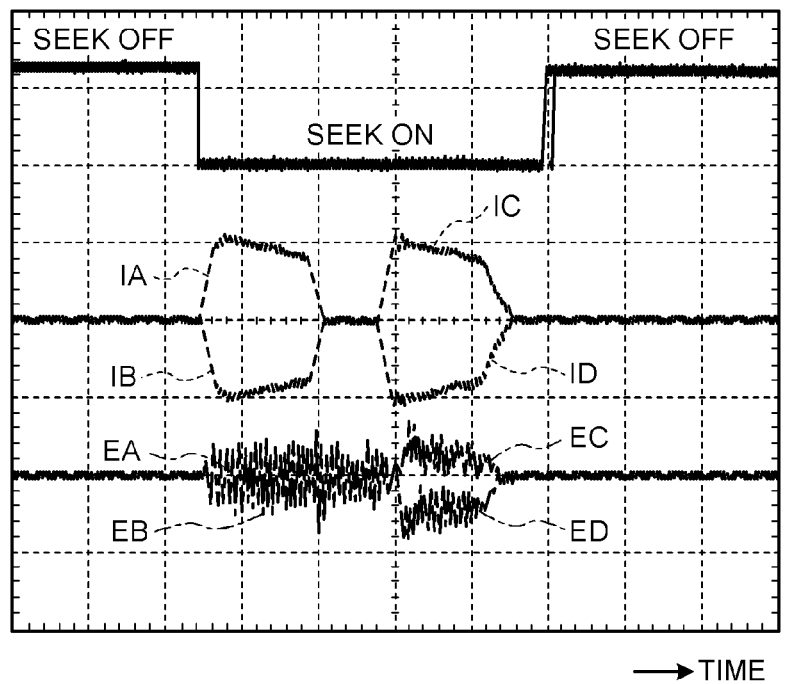
FIG. 9A is a diagram illustrating a voice coil current and a head-position predictive error when the demodulation window is fixed corresponding to the seek speed.
Figure 9B:
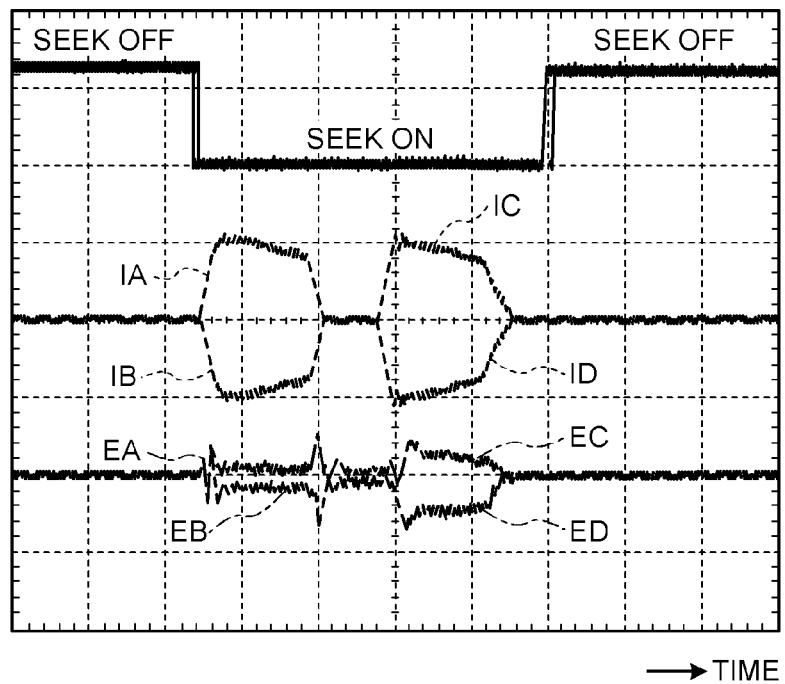
FIG. 9B is a diagram illustrating a voice coil current and a head-position predictive error when the demodulation window is switched corresponding to the seek speed.

FIG. 9A is a diagram illustrating a voice coil current and a head-position predictive error when the demodulation window is fixed regardless of the seek speed. FIG. 9B is a diagram illustrating a voice coil current and a head-position predictive error when the demodulation window is switched corresponding to the seek speed.

In FIG. 9A, respective currents IA, IB, IC, and ID flow to the voice coil motor 4 when the seeking is turned on. Here, the current IA is a forward current during acceleration, the current IB is a reverse current during acceleration, the current IC is a forward current during deceleration, and the current ID is a reverse current during deceleration. At this time, fixing the demodulation window increases respective variations of predictive errors EA, EB, EC, and ED of the head position. The predictive errors EA, EB, EC, and ED correspond to the respective currents IA, IB, IC, and ID. Here, the predictive errors EA, EB, EC, and ED are differences between an estimated position and a measured position of the magnetic head HM. The estimated position of the magnetic head HM can be obtained from the previous measured position and estimated speed of the magnetic head HM. This estimated speed can be obtained using an observer that simulates the operation of the magnetic head HM. The measured position of the magnetic head HM can be obtained based on the demodulation result of the burst pattern 23 read by the read head HR.

On the other hand, switching the demodulation window corresponding to the seek speed allows reducing the variations of the predictive errors EA, EB, EC, and ED of the head position as illustrated in FIG. 9B.

With the above-described embodiment, the demodulation window is switched such that the amplitude of the fundamental wave component of the burst pattern 23 transitions from the decreasing direction to the increasing direction along with the increase in seek speed, so as to increase the seek speed that ensures the linearity during demodulation of the head position.

What is claimed is:

1. A head position demodulating method, comprising switching a demodulation window with respect to a null-type burst pattern recorded on a magnetic disk such that an amplitude of a fundamental wave component of the null-type burst pattern transitions from a decreasing direction to an increasing direction corresponding to seek speed during demodulation of the null-type burst pattern.

2. The method according to claim 1, wherein the demodulation window is switched such that the amplitude of the fundamental wave component of the null-type burst pattern does not become indefinite.

3. The method according to claim 1, further comprising:
setting a first demodulation window during demodulation of the null-type burst pattern; and
switching to a second demodulation window different from the first demodulation window in a case where the amplitude of the fundamental wave component of the null-type burst pattern calculated based on the first demodulation window is within a predetermined range of a seek speed including a turning point that turns from a decreasing direction to an increasing direction along with an increase in seek speed.

4. The method according to claim 3, further comprising switching to a third demodulation window different from the windows in a case where the amplitude of the fundamental wave component of the null-type burst pattern calculated based on the second demodulation window is within a predetermined range of a seek speed including a turning point that turns from a decreasing direction to an increasing direction along with an increase in seek speed.

5. The method according to claim 1, wherein the fundamental wave component of the null-type burst pattern is a sine component or a cosine component when a DFT (discrete Fourier transform) operation is performed on a signal obtained by reading out the null-type burst pattern using a magnetic head.

6. The method according to claim 1, wherein the demodulation window is switched to have a different time from a burst center to a center of the demodulation window, the burst center being a boundary between an N-phase and a Q-phase of the null-type burst pattern.

7. The method according to claim 1, wherein respective demodulation windows of an N-phase and a Q-phase of the null-type burst pattern are set to be mutually symmetrical with respect to a burst center as a boundary between the N-phase and the Q-phase of the null-type burst pattern.

8. The method according to claim 1, wherein the demodulation window is switched before respective amplitudes of the fundamental wave component with respect to the seek speed coincide with each other between the demodulation windows.

9. The method according to claim 1, further comprising performing speed compensation on the fundamental wave component of the null-type burst pattern extracted from a signal read out by a magnetic head in a state where a gain due to a seek speed is ignored.

10. The method according to claim 9, wherein assuming that a rotation correction angle due to the seek speed is denoted as $\theta$, the gain is given by $1/(\cos^2 \theta - \sin^2 \theta)$.

11. A magnetic disk device, comprising:
a magnetic head;
a magnetic disk that records a null-type burst pattern to determine a position of the magnetic head on a track based on a read result by the magnetic head; and
a magnetic recording controller configured to:
switch a demodulation window with respect to the null-type burst pattern such that an amplitude of a fundamental wave component of the null-type burst pattern transitions from a decreasing direction to an increasing direction corresponding to seek speed during demodulation of the null-type burst pattern read by the magnetic head; and
calculate a demodulation position of the magnetic head based on the fundamental wave component of the null-type burst pattern.

12. The magnetic disk device according to claim 11, wherein
the magnetic recording controller is configured to switch the demodulation window such that the amplitude of the fundamental wave component of the null-type burst pattern does not become indefinite.

13. The magnetic disk device according to claim 11, wherein
the magnetic recording controller is configured to:
set a first demodulation window during demodulation of the null-type burst pattern recorded on the magnetic disk; and
switch to a second demodulation window different from the first demodulation window in a case where the amplitude of the fundamental wave component of the null-type burst pattern calculated based on the first demodulation window is within a predetermined range of a seek speed including a turning point that turns from a decreasing direction to an increasing direction along with an increase in seek speed.

14. The magnetic disk device according to claim 13, wherein
the magnetic recording controller is configured to switch to a third demodulation window different from the windows in a case where the amplitude of the fundamental wave component of the null-type burst pattern calculated based on the second demodulation window is within a predetermined range of a seek speed including a turning point that turns from a decreasing direction to an increasing direction along with an increase in seek speed.

15. The magnetic disk device according to claim 11, wherein
the fundamental wave component of the null-type burst pattern is a sine component or a cosine component when a DFT (discrete Fourier transform) operation is performed on a signal obtained by reading out the null-type burst pattern using a magnetic head.

16. The magnetic disk device according to claim 11, wherein
the demodulation window is switched to have a different time from a burst center to a center of the demodulation window, the burst center being a boundary between an N-phase and a Q-phase of the null-type burst pattern.

17. The magnetic disk device according to claim 11, wherein
respective demodulation windows of an N-phase and a Q-phase of the null-type burst pattern are set to be mutually symmetrical with respect to a burst center as a boundary between the N-phase and the Q-phase of the null-type burst pattern.

18. The magnetic disk device according to claim 11, wherein
the magnetic recording controller is configured to switch the demodulation window before respective amplitudes of the fundamental wave component with respect to the seek speed coincide with each other between the demodulation windows.

19. The magnetic disk device according to claim 11, wherein
the magnetic recording controller is configured to perform speed compensation on the fundamental wave component of the null-type burst pattern extracted from a signal read out by a magnetic head in a state where a gain due to a seek speed is ignored.

20. The magnetic disk device according to claim 19, wherein
assuming that a rotation correction angle due to the seek speed is denoted as $\theta$, the gain is given by $1/(\cos^2 \theta - \sin^2 \theta)$.

* * * * *